United States Patent
Cancro et al.

(10) Patent No.: US 9,830,584 B2
(45) Date of Patent: Nov. 28, 2017

(54) DISPLAY AN ITEM DETAIL WITH A RECEIPT SNIPPET

(71) Applicant: Wal-Mart Stores, Inc., Bentonville, AR (US)

(72) Inventors: Richard Neil Cancro, Portland, OR (US); Douglas James Pedley, Portland, OR (US); Joel Bennett Acker, Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/092,437

(22) Filed: Nov. 27, 2013

(65) Prior Publication Data

US 2015/0149312 A1    May 28, 2015

(51) Int. Cl.
*G06Q 20/20*  (2012.01)
*G06Q 20/04*  (2012.01)
*G06Q 20/32*  (2012.01)
*G06Q 30/00*  (2012.01)

(52) U.S. Cl.
CPC ....... *G06Q 20/209* (2013.01); *G06Q 20/0453* (2013.01); *G06Q 20/322* (2013.01)

(58) Field of Classification Search
CPC ...... G06Q 20/209; G06Q 20/20; G06Q 30/06; G07G 1/12; G07G 5/00
USPC .......................................................... 705/24
See application file for complete search history.

(56) References Cited

U.S. PATENT DOCUMENTS

| | | | | |
|---|---|---|---|---|
| 7,797,192 | B2 * | 9/2010 | Mitchell et al. | 705/16 |
| 9,105,017 | B2 * | 8/2015 | Argue | G06Q 20/20 |
| 2004/0064373 | A1 * | 4/2004 | Shannon | 705/24 |
| 2007/0094088 | A1 * | 4/2007 | Mastie et al. | 705/24 |
| 2010/0177343 | A1 * | 7/2010 | Shapiro et al. | 358/1.15 |
| 2010/0306070 | A1 * | 12/2010 | Tabuchi et al. | 705/18 |
| 2011/0184822 | A1 * | 7/2011 | Matkovic | G06Q 20/202 705/18 |
| 2012/0290420 | A1 * | 11/2012 | Close | 705/17 |

\* cited by examiner

*Primary Examiner* — Garcia Ade
(74) *Attorney, Agent, or Firm* — Bryan Cave LLP

(57) ABSTRACT

The present disclosure extends to displaying a portion of an image representation of a paper receipt, the image portion corresponding to a selected item from a completed transaction. In embodiments, an "eReceipt," a digital representation of a paper receipt, is transmitted to and displayed on a customer computing device, such as an app installed on a smartphone. The eReceipt may include a list of items purchased at the transaction and additional information related to the transaction and/or items purchased. In response to the customer selecting one of the items listed on the eReceipt, a snippet of the image of the paper receipt is displayed, the snippet depicting the line item from the paper receipt that represents the selected item.

18 Claims, 6 Drawing Sheets

DISPLAY AN ITEM DETAIL WITH A RECEIPT SNIPPET

BACKGROUND

Upon completion of a retail transaction, the retailer may typically generate a paper receipt for the customer as a record of the transaction. Some retailers may additionally or alternatively provide an electronic version of a receipt to their customers for display on a customer's computing device.

Receipts typically include a list of products purchased in the transaction, with each product displayed on its own line on the receipt. Each line item may additionally contain information such as price, product code (for example, a Universal Product Code ("UPC")), quantity, product weight, and other potentially relevant information.

Receipt line items sometimes include abbreviations of a product name or other code names that represent the product. Some abbreviations or product code names may obfuscate the product identity, such that some customers may not be able to readily ascertain which product is represented in that line item.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
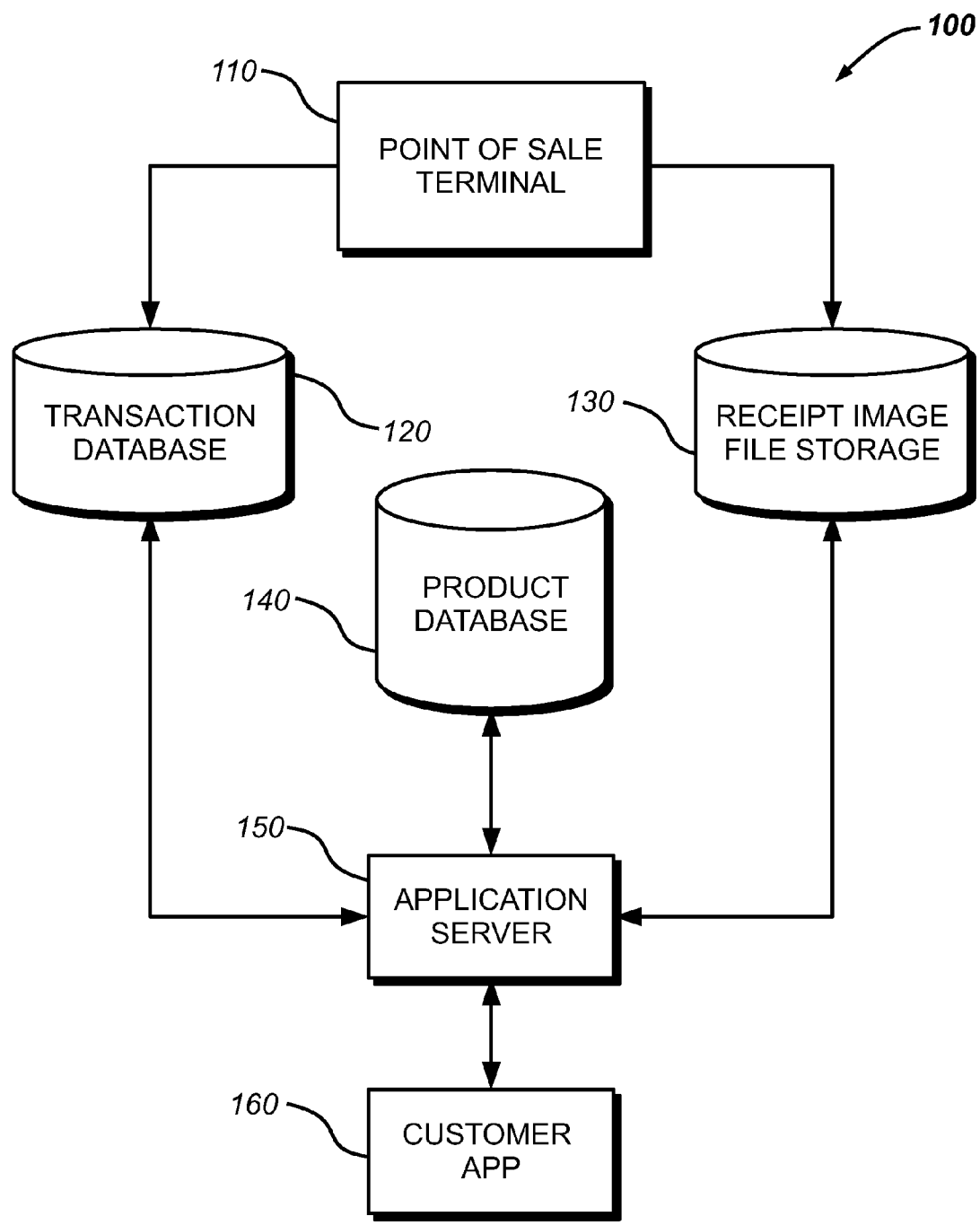
FIG. 1 is a block diagram illustrating components of a receipt snippet system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure extends to methods, systems, and computer programs for rendering a selected portion of a receipt and other information related to a transaction and displaying the selected portion and/or other information on a computing device. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 1 is a block diagram illustrating an example of a receipt snippet system 100 of the present disclosure. As used in the present disclosure, a "snippet" of a receipt is an image depicting a selected and/or relevant cropped portion of a paper receipt. For example, a snippet of a receipt may comprise a digital image depicting a single, selected line item from the receipt. According to some embodiments of the present disclosure, receipt snippet system 100 comprises a point of sale ("POS") terminal 110, a transaction database 120, a receipt image file storage 130, a product database 140, an application server 150, and a customer app 160. In embodiments, POS terminal 110 comprises a cash register. POS terminal 110 is adapted to carry out a transaction, including recording payment, inputting product codes for purchased products, inputting the customer's identity, and carrying out other functions related to product sales transactions.

In embodiments, POS terminal 110 can transmit data related to transactions to transaction database 120. Transaction database 120 may associate certain retail purchase transactions with a customer by linking the transaction to the unique customer identification number or other customer indicia. Transaction database 120 can store data related to each transaction such as product codes, prices, product quantities and/or weights, and other relevant data regarding the transaction.

POS terminal 110 includes a printer for creation of a paper receipt, which may be given to the customer upon completion of the transaction. POS terminal 110 can create a digital image representative of the paper receipt and transmit the receipt image to receipt image file storage 130 along with metadata that links the receipt image to the corresponding customer and/or transaction.

Product database 140 comprises a record of products offered for sale by a retailer. UPC numbers and associated product names and/or prices may be included in the data stored in product database 140. In embodiments, additional information regarding specific products such as food nutrition information or the like may be stored in product database 140.

Application server 150 is adapted to interface with transaction database 120, receipt image file storage 130, product database 140, and customer app 160. Application server 150 can receive requests from customer app 160, query transaction database 120, receipt image file storage 130 and/or product database 140 for data corresponding to the request, and transmit a response to customer app 160 for display to a customer. In embodiments, application server 150 can analyze and process images from receipt image file storage 130 and associate line items depicted in a receipt image with corresponding items from a completed transaction for which data was stored in transaction database 120. Application server 150 can further query item details from product database 140 that corresponds to a product purchased in a selected transaction. Analyzed and processed information and/or images may be formatted for a mobile device or other computing device display and transmitted to customer app 160 for display to a customer.

In embodiments, customer app 160 is an application installed on a smartphone or similar mobile device. In alternative embodiments, customer app 160 is a web application (for example, a web browser-supported software application). Customer app 160 can receive data and instructions from application server 150 and display user interfaces that selectively provide information related to completed transactions. In embodiments, customer app 160 can display an eReceipt of a completed transaction, an item detail of a purchased item, additional item information, and/or a selected portion of a receipt image. According to embodiments of the present disclosure, an eReceipt comprises a tabulated digital representation of a completed transaction. In embodiments, an eReceipt is formatted to enhance readability on a display device such as a mobile device.

POS terminal 110, transaction database 120, receipt image file storage 130, product database 140, or application server 150 may all be implemented in one or more servers. Further, each of POS terminal 110, transaction database 120, receipt image file storage 130, product database 140, and application server 150 may comprise multiple servers to increase system efficiency by dividing tasks. The multiple servers may have mirrored data and/or parallel processes to prevent data loss in case of a failure and/or to decrease access and response times for queries. In alternative embodiments of the present disclosure, transaction database 120, receipt image file storage 130, product database 140, and/or application server 150 may be implemented in computer-readable instructions and data stored on the customer's computing device (i.e., a smartphone app).

POS terminal 110, transaction database 120, receipt image file storage 130, product database 140, and application server 150 may communicate with each other over one or more networks including, but not limited to: a wireless network, a cellular network, an intranet, the Internet, or combinations thereof.

Figure 2:
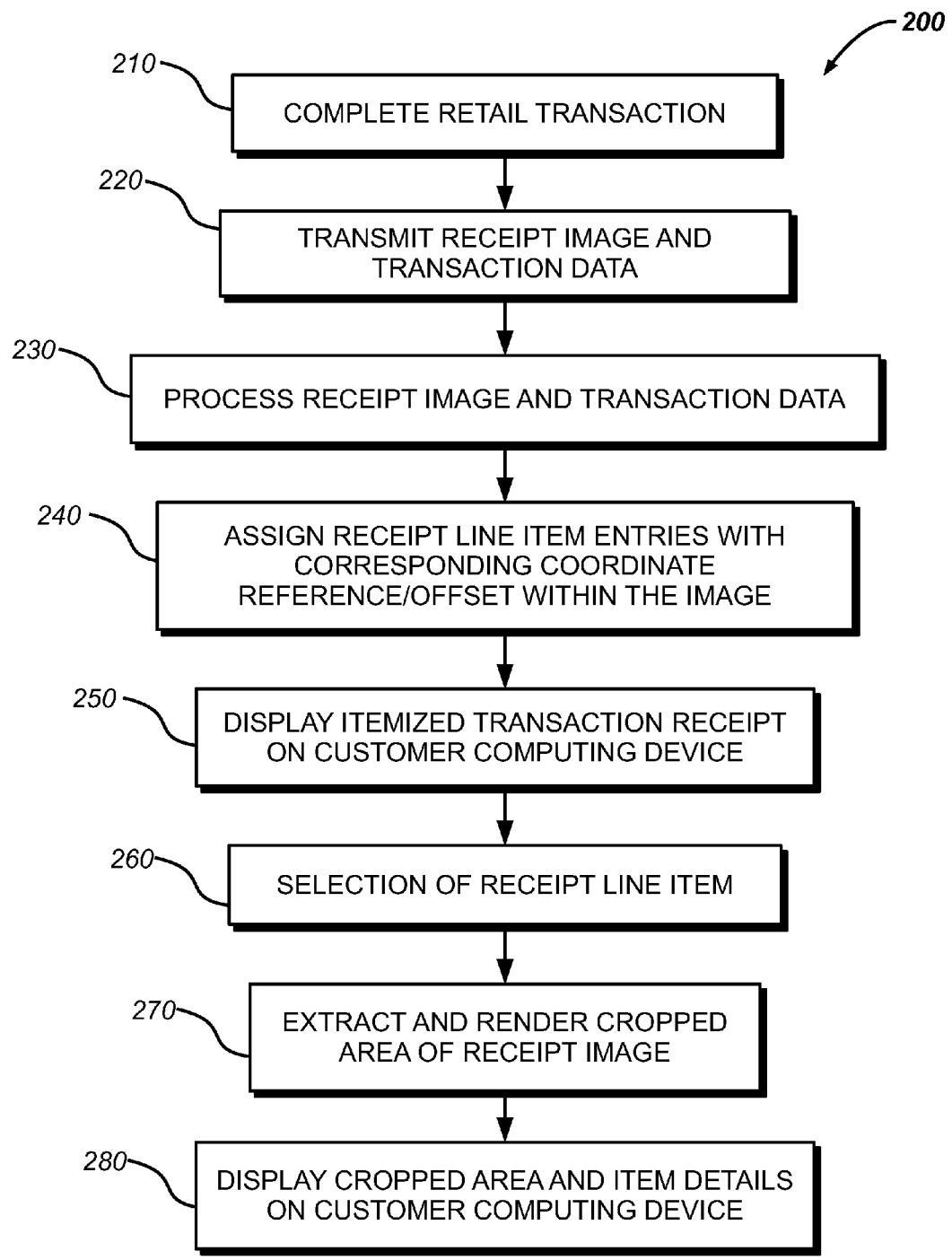
FIG. 2 is a flow chart illustrating an example method for displaying an item detail with a receipt snippet in accordance with embodiments of the present disclosure.

In operation, receipt snippet system 100 is adapted to provide, to a customer, details regarding purchased products along with an image depicting a relevant portion of a paper receipt corresponding to the transaction. Referring now to FIG. 2, embodiments of the present disclosure comprise method 200. At operation 210, a retail transaction is completed at POS terminal 110. The customer's identity may be input into POS terminal 110 to link the transaction to the paying customer so that the customer may later access information related to the transaction. In particular, a transaction may be linked to a unique customer identification number that represents the customer. The customer's identity may be input at POS terminal 110 at the time of the transaction by the customer or a retail sales associate by inputting identifying indicia of the customer into POS terminal 110. Identifying indicia may include the customer identification number, the customer's name, the customer's telephone number, the customer's credit or debit card number, or the like. In alternative embodiments, customers carry a keychain tag or card that comprises identifying indicia thereon, such as a barcode of the customer identification number, an RFID tag carrying the customer identification number, or the like. The tag or card may be input at the POS terminal 110 by a reader. In embodiments, the tag, card, or the like comprises a reward membership to incentivize the customer to present it at the POS terminal 110. During operation 210, POS terminal 110 prints a receipt and generates an image of the receipt. POS terminal 110 also generates and/or gathers data related to the transaction such as product identification codes, customer identification number, product pricing, time and date, and other information related to the transaction.

At operation 220, the transaction data is transmitted and stored at transaction database 120 and the receipt image is transmitted and stored at receipt image file storage 130. In alternative embodiments, the transaction data and the receipt image are transmitted directly to application server 150 for processing. Data stored at transaction database 120 may include the product(s) purchased, including product UPC numbers or other product codes, the price paid for each product, the customer identification number, the date and time, and other relevant information about the transaction. In alternative embodiments, transactions may be input to transaction database 120 at a time after completion of the transaction by inputting a code on a paper receipt for that transaction. The code could be represented by a hyperlink, a unique numerical code, a one- or two-dimensional barcode on the paper receipt, or other means. In embodiments, the code for that transaction may be input by a customer scanning the receipt, or particularly the barcode thereon, with a smartphone. In alternate embodiments, the code on the receipt is submitted on a webpage by a customer. Upon inputting the code, application server 150 transmits the customer's identifying indicia with a transaction identifier to the transaction database 120, which may then associate the transaction with that customer. After linking a completed transaction with a particular customer, the retailer can then allow the customer to view details regarding the transaction on the customer's computing device. For example, the customer may connect his or her smartphone, having the retailer's app installed thereon, to an online account administered by the retailer. The customer may then have access to data regarding previous transactions linked to that customer's account or other information as selectively provided by the retailer.

At operation 230, application server 150 processes the receipt image. In embodiments, application server 150 carries out an optical character recognition ("OCR") operation on the receipt image and/or inputs data generated by POS terminal 110 to create an itemized transaction record, which may be referred to herein as an "eReceipt." The eReceipt may comprise a listing of products purchased, the corresponding prices, and other transaction data. In embodiments, an eReceipt comprises a table or list of line items, wherein each item represents a purchased product, a tendered coupon, a return, a discount, or other transaction items.

At operation 240, application server 150 traverses the receipt image to assign, to each line item entry of the eReceipt, corresponding coordinates on the receipt image. Application server 150 may use the results of the OCR operation to identify image coordinates for any particular line item. Additionally or alternatively, application server 150 may be programmed with receipt formatting parameters such as line height, spacing, margin sizes, and the like in order to calculate the offset for any particular line item. Additional edge cases may be programmed in to application server 150 to meet various circumstances. In embodiments, a cropping window is generated within the receipt image that highlights a particular line item. In embodiments, the cropping window is made manifest in one or more vertical offset coordinates, each offset coordinate corresponding to a line item. The offset coordinates may be transmitted, along with line item descriptions, to customer app 160. Accordingly, at operation 240, each item listed on the eReceipt may be associated with a coordinate location within the receipt image where the same transaction item is depicted.

At operation 250, a customer may wish to view information related to a completed transaction. The customer may access the eReceipt rendered on his or her computing device by following menu options on the retailer's app installed on a mobile computing device, via the retailer's website, or other like software applications, thereby directing the computing device to display the eReceipt.

The customer may wish to view additional information related to a selected line item on the displayed eReceipt. At operation 260, the customer may select that line item.

At operation 270, the customer's computing device can extract and render a cropped area of the receipt image based on the offset coordinates for the image of the selected line item. At operation 280, the cropped "snippet" can be displayed to the customer with other item details that may be relevant to the customer. For example, the customer may select additional rendered objects to direct the computing device to display nutrition information for a food item or other product information made available by the retailer. In other examples, the computing device may display warranty information, product information, product usage instructions, links and/or descriptions for related products, links to webpages with additional product-related information, services, message forums, and/or features, and the like.

Figure 3:
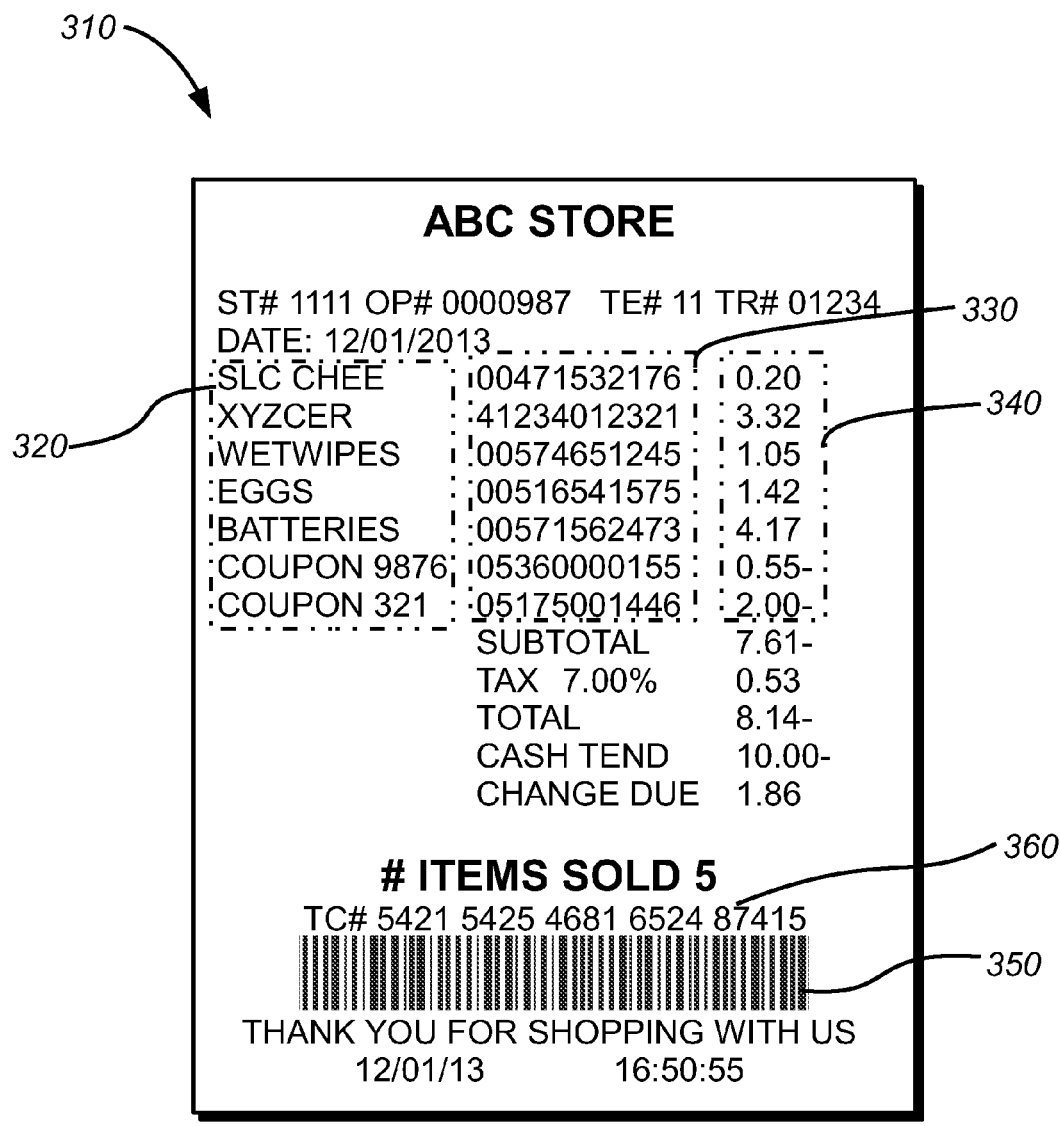
FIG. 3 depicts a paper receipt reflecting a completed retail transaction.

Referring now to FIG. 3, a paper receipt 310 reflecting a completed retail transaction is depicted. The paper receipt includes product, coupon, discount, returned item or other line item names 320 (which may typically be abbreviated), UPC numbers 330 for each line item, line item prices 340, and other transaction information. As depicted in FIG. 3, receipt 310 includes a bar code 350 representing a unique transaction identifier number 360.

Figure 4:
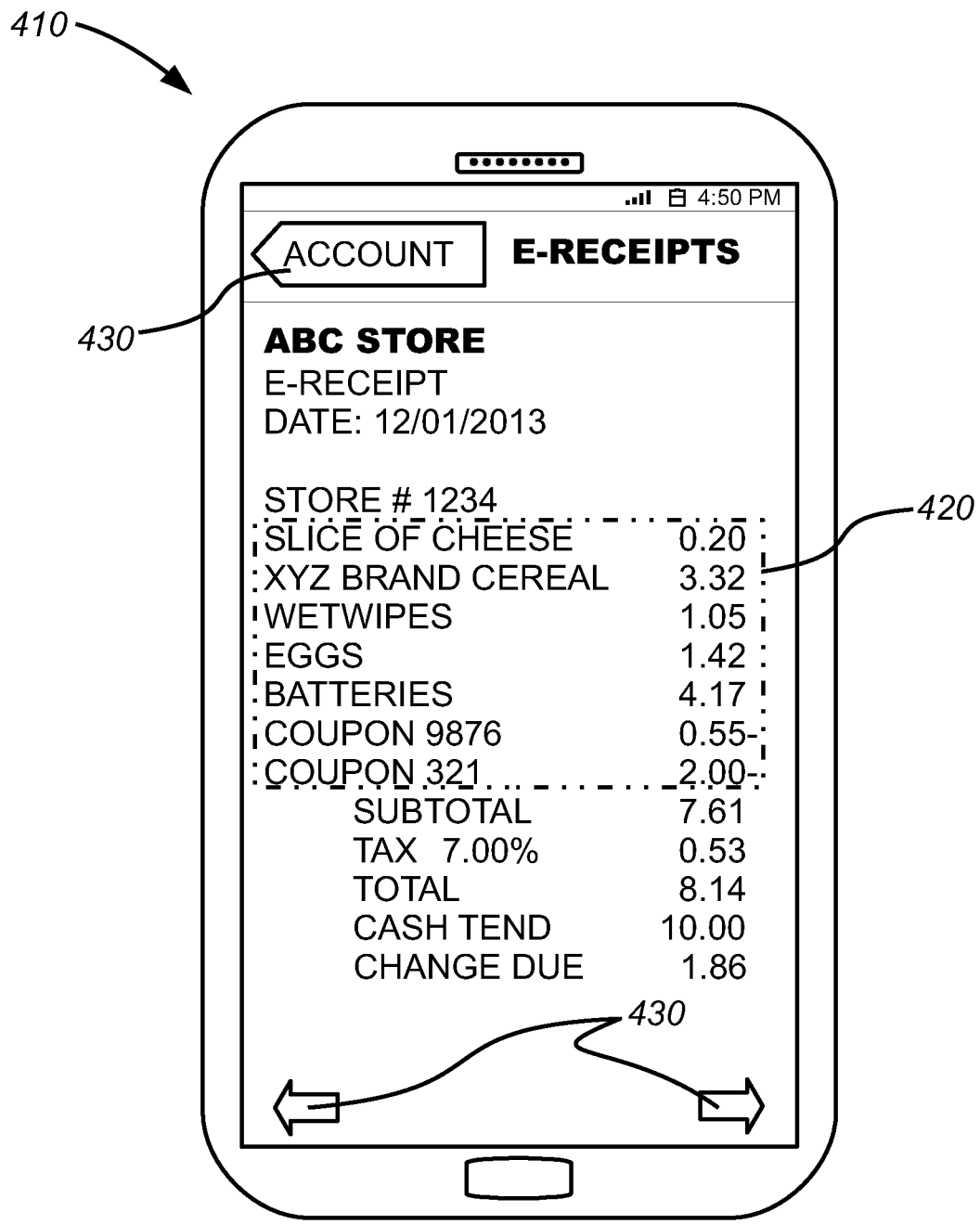
FIG. 4 is an illustration of a computing device displaying an eReceipt according to embodiments of the present disclosure.

Referring now to FIG. 4, an embodiment of the present disclosure is depicted, showing a possible appearance of an eReceipt on a smartphone 410 or like device. The graphical user interface displayed on smartphone 410 comprises various input objects to let a customer navigate the application. In embodiments, an eReceipt comprises a list of line items 420 as is commonly included on traditional paper receipts. It may be noted that the names of line items 420 may generally contain more information than the item names 320 depicted on the paper receipt 310. The electronic receipt may further comprise navigation objects 430 that allow the customer to return to an account menu or browse other eReceipts that are associated with the customer's account. By selecting one of the line items 420, the customer may view additional information regarding that item.

Figure 5:
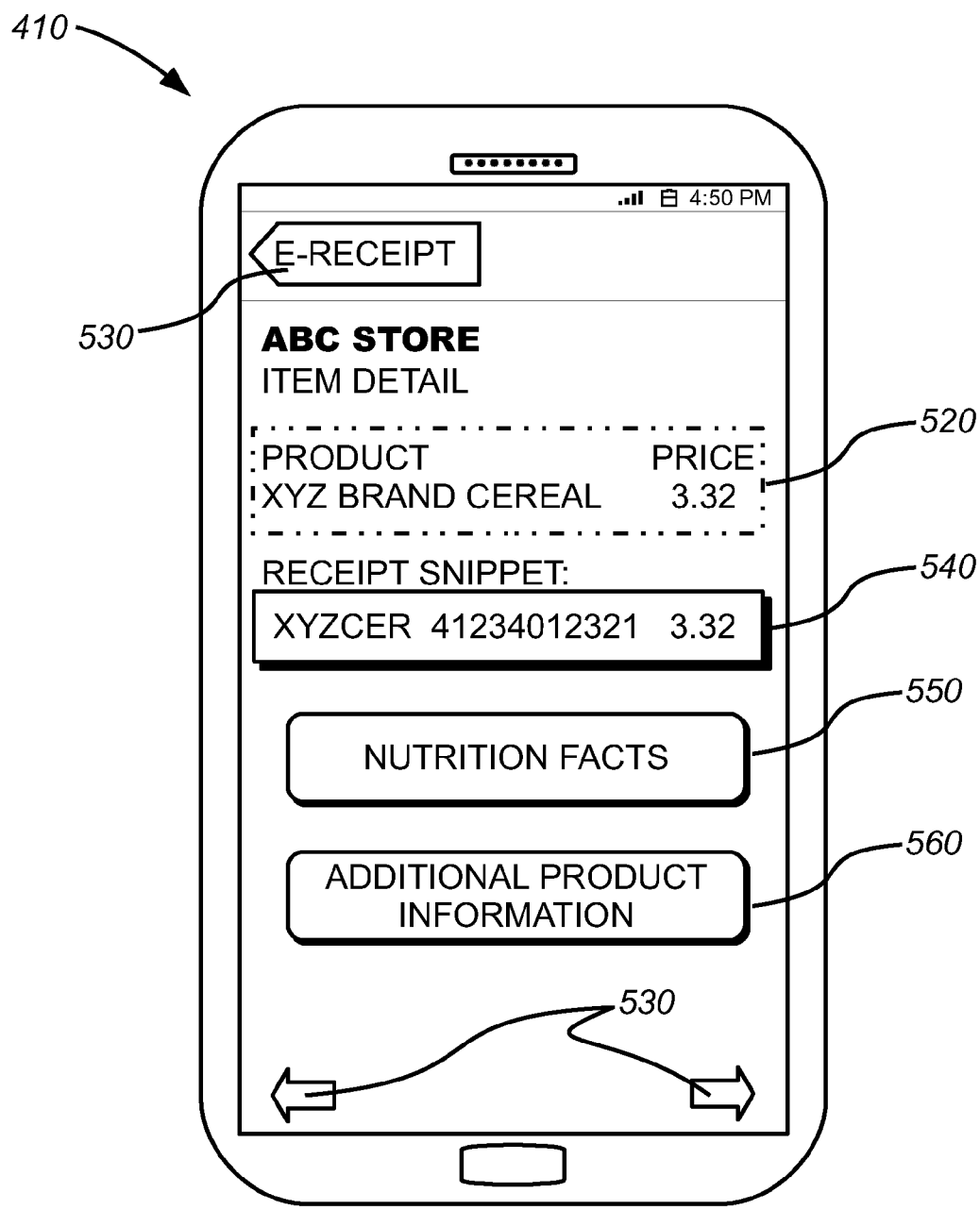
FIG. 5 is an illustration of a computing device displaying an item detail with a receipt snippet according to embodiments of the present disclosure.

Referring now to FIG. 5, an embodiment of the present disclosure is depicted, showing a possible appearance of an item detail 520 with a corresponding receipt image snippet 540 on a smartphone 410 or like device. As shown in FIG.

5, receipt image snippet 540 is an image that has the same or similar appearance as the portion of paper receipt 310 that corresponds to the selected line item. The customer may readily compare the actual paper receipt with the snippet 540 to verify and receive information regarding that line item. Additional navigation objects 530 can allow the customer to return to the eReceipt or browse other item details associated with the eReceipt. Navigation objects 550, 560 may allow the customer to view additional item details such as nutrition facts for a food product or other data relevant to the item.

Figure 6:
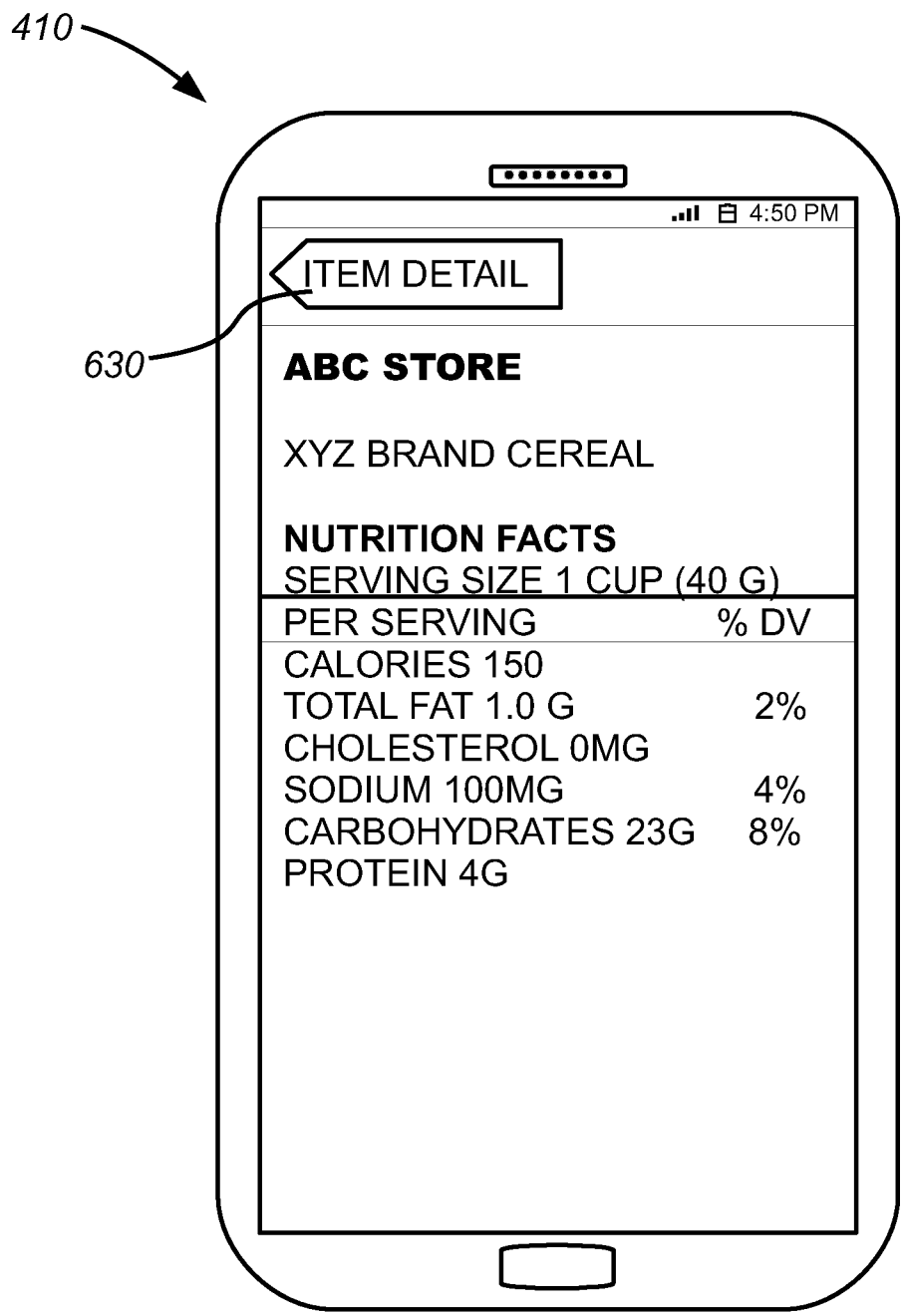
FIG. 6 is an illustration of a computing device displaying additional item details according to embodiments of the present disclosure.

Referring now to FIG. 6, an additional item information display is depicted on a smartphone 410 or like device according to embodiments of the present disclosure. The additional item comprises nutrition facts of the selected product. Navigation object 630 can allow the customer to return to the item detail. Additional information or navigation objects may be rendered as provided by the retailer.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A method of displaying an item detail with an electronic receipt snippet being implemented via computer program instructions configured to be stored in computer-readable media, the method comprising:
   receiving, at a transaction database and from a point of sale terminal, a dataset corresponding to a transaction completed at the point of sale terminal, wherein the dataset includes data related to at least one item represented in the transaction;
   receiving, at an image storage and from the point of sale terminal, a receipt image generated by the point of sale terminal and depicting an image of a receipt of the transaction;
   transmitting the dataset and the receipt image to an application server;
   generating, through the application server, a cropping window highlighting the at least one item within the receipt image, wherein the cropping window is visible in at least one vertical offset coordinate that corresponds to the at least one item;
   determining, through the application server, from the cropping window, the at least one vertical offset coordinate on the receipt image of a receipt text, wherein the receipt text corresponds to the at least one item;
   transmitting, to a customer computing device in communication with the application server, an electronic receipt, wherein the electronic receipt comprises a text representation of the at least one item as a function of the at least one vertical offset coordinate by the application server;
   receiving a first selection of the at least one item as a function of the electronic receipt; and
   coordinating displaying, on the customer computing device, a portion of the receipt image corresponding to the at least one vertical offset coordinate of the receipt text for the at least one item.

2. The method of claim 1, further comprising performing an optical character recognition operation on the receipt text of the receipt image to convert the receipt text into machine-encoded text and identify image coordinates on the receipt image for the at least one item.

3. The method of claim 1, wherein the transaction comprises a retail transaction.

4. The method of claim 1, wherein the at least one item is selected from a group stored within a product database within a memory unit, the group consisting of a product, a coupon, and a discount.

5. A receipt snippet system comprising:
   a first server communicatively coupled to a point of sale terminal and having a memory unit storing:
      a transaction database adapted to receive data corresponding to at least one item in a transaction completed at the point of sale terminal;
      a receipt image file storage adapted to receive and store a receipt image generated by the point of sale terminal and depicting an image of a receipt of the transaction from the point of sale terminal; and
      a product database comprising a record of products offered for sale; and
   an application server in communication with the point of sale terminal and the first server, the application server adapted to:
      generate a cropping window highlighting the at least one item within the receipt image, wherein the cropping window is visible in at least one vertical offset coordinate that corresponds to the at least one item;
      determine, from the cropping window, the at least one vertical offset coordinate on the receipt image of a receipt text, wherein the receipt text corresponds to the at least one item; and transmit data and instructions to a customer computing device in communication with the application server, thereby directing the customer computing device to:
         render an itemized list depicting the transaction and including the at least one item, wherein the itemized list comprises a text representation of the at least one item as a function of the at least one vertical offset coordinate by the application server;
         receive a first selection of the at least one item as a function of the itemized list; and
         display a portion of the receipt image, wherein the portion corresponds to the at least one vertical offset coordinate of the receipt text for the at least one item.

6. The receipt snippet system of claim 5, wherein the application server is further adapted to transmit the at least one vertical offset coordinate to the customer computing device.

7. A method of displaying an item detail with an electronic receipt snippet being implemented via computer program instructions configured to be stored in computer-readable media, the method comprising:
   receiving, at a transaction database and from a point of sale terminal, a dataset corresponding to a transaction completed at the point of sale terminal, wherein the dataset includes data related to at least one item represented in the transaction;
   receiving, at an image storage and from the point of sale terminal, a receipt image generated by the point of sale terminal and depicting an image of a receipt of the transaction;
   transmitting the dataset and the receipt image to an application server;
   generating, through the application server, a cropping window highlighting the at least one item within the receipt image, wherein the cropping window is visible in at least one vertical offset coordinate that corresponds to the at least one item;
determining, through the application server, from the cropping window, the at least one vertical offset coordinate on the receipt image of a receipt text, wherein the receipt text corresponds to the at least one item;
transmitting, to a customer computing device in communication with the application server, an electronic receipt, wherein the electronic receipt comprises a text representation of the at least one item as a function of the at least one vertical offset coordinate by the application server;
receiving a first selection of the at least one item as a function of the electronic receipt; and
transmitting, from the application server to the customer computing device, data that allows the customer computing device to display a portion of the receipt image corresponding to the at least one vertical offset coordinate of the receipt text for the at least one item.

8. The receipt snippet system of claim 5, wherein the application server is further adapted to perform an optical character recognition operation on the receipt text of the receipt image to convert the receipt text of the receipt image into machine-encoded text and identify image coordinates on the receipt image for the at least one item.

9. The receipt snippet system of claim 5, wherein the transaction comprises a retail transaction.

10. The method of claim 7, further comprising performing an optical character recognition operation on the receipt text of the receipt image to convert the receipt text of the receipt image into machine-encoded text.

11. The method of claim 7, wherein the transaction comprises a retail transaction.

12. The method of claim 7, further comprising:
coordinating displaying one or more navigational objects on the customer computing device, the one or more navigational objects each comprising a hyperlink;
receiving a second selection of the one or more navigational objects from the customer computing device; and
transmitting, to the customer computing device, the item detail corresponding to the at least one item, the item detail comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

13. The method of claim 7, wherein the at least one item is selected from a group stored within a product database within a memory unit, the group consisting of a product, a coupon, and a discount.

14. The method of claim 1, further comprising:
coordinating displaying one or more navigational objects on the customer computing device, the one or more navigational objects each comprising a hyperlink;
receiving a second selection of the one or more navigational objects from the customer computing device; and
coordinating displaying, on the customer computing device, additional item details for the at least one item, the additional item details comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

15. The method of claim 1, wherein:
the transaction comprises a retail transaction;
the at least one item is selected from a group stored within a product database within a memory unit, the group consisting of a product, a coupon, and a discount; and
the method further comprises:
performing an optical character recognition operation on the receipt text of the receipt image to convert the receipt text into machine-encoded text and identify image coordinates on the receipt image for the at least one item;
coordinating displaying one or more navigational objects on the customer computing device, the one or more navigational objects each comprising a hyperlink;
receiving a second selection of the one or more navigational objects from the customer computing device; and
coordinating displaying, on the customer computing device, additional item details for the at least one item, the additional item details comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

16. The receipt snippet system of claim 5, wherein the application server is further configured to:
coordinate displaying one or more navigational objects on the customer computing device, the one or more navigational objects each comprising a hyperlink;
receive a second selection of the one or more navigational objects from the customer computing device; and
coordinating displaying, on the customer computing device, additional item details for the at least one item, the additional item details comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

17. The receipt snippet system of claim 5, wherein:
the transaction comprises a retail transaction; and
the application server is further configured to:
perform an optical character recognition operation on the receipt text of the receipt image to convert the receipt text into machine-encoded text and identify image coordinates on the receipt image for the at least one item;
coordinate displaying one or more navigational objects on the customer computing device, the one or more navigational objects each comprising a hyperlink;
receive a second selection of the one or more navigational objects from the customer computing device; and
coordinating displaying, on the customer computing device, additional item details for the at least one item, the additional item details comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

18. The method of claim 7, wherein:

the transaction comprises a retail transaction;

the method further comprises: performing an optical character recognition operation on the receipt text of the receipt image to convert the receipt text of the receipt image into machine-encoded text;

coordinating displaying one or more navigational objects on the customer computing device, the one or more navigational objects each comprising a hyperlink;

receiving a second selection of the one or more navigational objects from the customer computing device; and transmitting, to the customer computing device, an item detail corresponding to the at least one item, the item detail comprising at least one of warranty information for the at least one item, item information for the at least one item, usage instructions for the at least one item, one or more additional hyperlinks related to the at least one item, features of the at least one item, a message forum related to the at least one item, or descriptions of additional items related to the at least one item.

* * * * *